United States Patent
Sarwar et al.

(10) Patent No.: US 12,411,787 B2
(45) Date of Patent: Sep. 9, 2025

(54) SOFT DISCONNECT AND RECONNECT FOR USB TUNNELED PATH

(71) Applicant: Advanced Micro Devices, Inc., Santa Clara, CA (US)

(72) Inventors: Zeeshan Sarwar, Folsom, CA (US); Preetesh Mahendra, Folsom, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 149 days.

(21) Appl. No.: 18/502,455

(22) Filed: Nov. 6, 2023

(65) Prior Publication Data

US 2025/0147911 A1    May 8, 2025

(51) Int. Cl.
*G06F 13/38* (2006.01)
*G06F 13/42* (2006.01)

(52) U.S. Cl.
CPC ........ *G06F 13/387* (2013.01); *G06F 13/4282* (2013.01)

(58) Field of Classification Search
CPC ............................ G06F 13/387; G06F 13/4282
See application file for complete search history.

(56) References Cited

U.S. PATENT DOCUMENTS

| | | | | |
|---|---|---|---|---|
| 10,387,348 | B2* | 8/2019 | Harriman | G06F 13/387 |
| 12,228,992 | B2* | 2/2025 | Regupathy | G06F 1/3228 |
| 2021/0365399 | A1* | 11/2021 | Dai | G06F 13/4221 |
| 2023/0289312 | A1* | 9/2023 | Rogers | G06F 13/4068 |

OTHER PUBLICATIONS

Welcome to the 80Gpbs Ultra-High Speed Era of USB4 [online]; Granite River Labs, GRL Team, Jan. 17, 2023 [retreived May 23, 2025], Retrieved from the Internet <URL: https://www.graniteriverlabs.com/en-us/technical-blog/usb4-80-cio80>. (Year: 2023).*

Kumar, Sanjeet; USB3 Gen T Tunneling Over USB4 [online]; Jan. 16, 2023 [retreived May 22, 2025]; Retreived from the Internets <URL: https://community.cadence.com/cadence_blogs_8/b/fv/posts/usb3-gen-t-tunneling-over-usb4>. (Year: 2023).*

\* cited by examiner

*Primary Examiner* — Eric T Oberly
(74) *Attorney, Agent, or Firm* — Slater Matsil, LLP

(57) ABSTRACT

A method of operating a Universal Serial Bus (USB) host system includes: disabling, by a USB host driver of the USB host system, a first tunneled path between a first port of a USB host controller of the USB host system and a first port of a USB device controller of a USB device, where the first tunneled path is configured to, through protocol tunneling, transmit first data packets of a first protocol format; sending, by the USB host driver, a request for protocol switching to a connection manager of the USB host system; disconnecting, by the connection manager, the first tunneled path; and establishing, by the connection manager, a second tunneled path between a second port of the USB host controller and a second port of the USB device controller.

20 Claims, 7 Drawing Sheets

700 disable, by a USB host driver of a USB host system, a first tunneled path between a first port of a USB host controller of the USB host system and a first port of a USB device controller of a USB device — 710 send, by the USB host driver, a request for protocol switching to a connection manager of the USB host system — 720 disconnect, by the connection manager, the first tunneled path — 730 establish, by the connection manager, a second tunneled path between a second port of the USB host controller and a second port of the USB device controller — 740

Fig. 7

SOFT DISCONNECT AND RECONNECT FOR USB TUNNELED PATH

TECHNICAL FIELD

The present invention relates generally to Universal Serial Bus (USB) systems and the operation of USB systems.

BACKGROUND

Universal Serial Bus (USB) standard is an industry standard that specifies the physical interfaces and protocols for connecting, data transferring, and powering of hosts (e.g., personal computers), peripherals (e.g., keyboards and mobile devices), and intermediate hubs. USB was designed to standardize the connection of peripherals to computers, replacing various interfaces such as serial ports, parallel ports, and game ports. The USB connection has become commonplace on a wide range of devices, such as keyboards, mice, cameras, printers, scanners, flash drives, smartphones, game consoles, and power banks.

Multiple generations of USB specifications have been developed over the years. With each newer generation of the USB specification, the USB standard supports a higher data rate. Generally, newer generations of USB systems support multiple operation modes or data rates and are backward compatible with older generations of systems. Due to the multiple modes and data rates supported by different USB systems, interoperability between USB systems with different capabilities still poses a technical challenge. There is a need in the art to improve the interoperability of USB systems.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 illustrates a flow chart of a method of operating a USB host system in some implementations.

DETAILED DESCRIPTION OF ILLUSTRATIVE EXAMPLES

Figure 1:
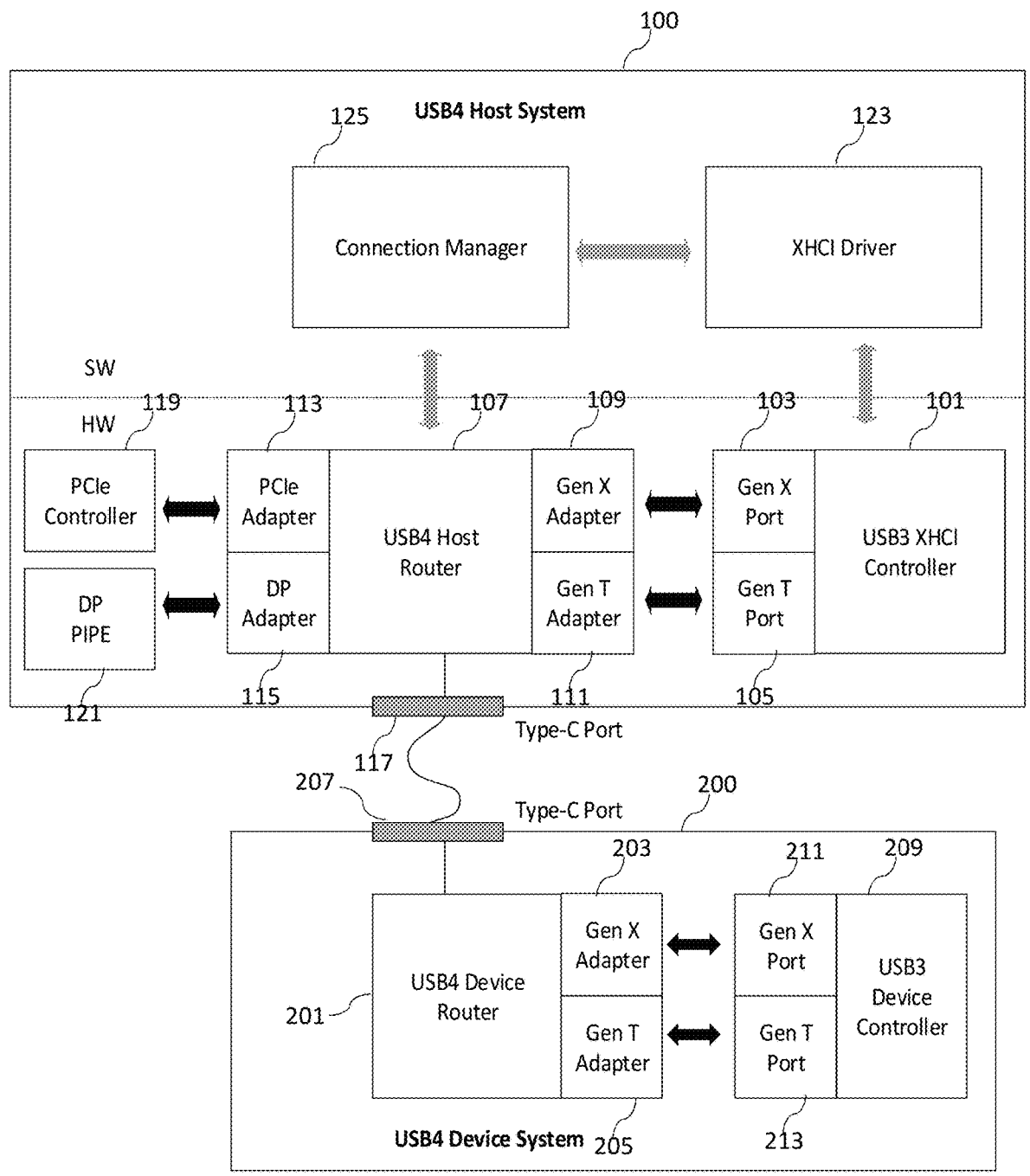
FIG. 1 illustrates block diagrams of a USB host system and a USB device system in an implementation.

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component or signal.

The present disclosure will be described with respect to examples in a specific context, namely soft disconnect and reconnect of tunneled paths between USB systems (e.g., between a USB host system and a USB device system) to achieve dynamic protocol switching. Note that while USB4 systems may be used as examples in the discussion herein, skilled artisans will readily appreciate that the principle disclosed herein is generic and may be applied to other USB systems, e.g., future generations of USB systems (e.g., USB systems based on future versions of USB specifications).

Currently, there are four generations of USB specifications: USB 1. "x", USB 2.0, USB 3. "x", and USB4. The USB4 specification enhances the data transfer and power supply functionality with connection-oriented, tunneling architecture designed to combine multiple protocols onto a single physical interface, so that the total speed and performance of the USB4 Fabric can be dynamically shared.

The USB4 version 2 specification defines an additional USB3 tunneling protocol: Gen T tunneling protocol. This protocol is in addition to the existing Gen X tunneling protocol which was defined in USB4 version 1. Gen T tunneling protocol supports full 80 Gbps USB4 version 2 bandwidth, while Gen X tunneling is based on the USB3.2 specification, and is limited to a maximum bandwidth of 20 Gbps.

FIG. 1 illustrates block diagrams of a USB host system 100 and a USB device system 200 in an implementation. The USB host system 100 (may also be referred to as a USB host) may be, e.g., a computer, and the USB device system 200 (may also be referred to as a USB device) may be, e.g., a USB drive, a digital camera, a mouse, or the like. Note that for simplicity, not all features of the USB host system 100 and the USB device system 200 are illustrated.

As illustrated in FIG. 1, the USB host system 100 includes a USB host controller 101, a USB host router 107, a USB host driver 123, and a connection manager 125. The USB host controller 101 and the USB host router 107 are hardware and are shown in the hardware (HW) domain of the USB host system 100 in FIG. 1. The USB host driver 123 and the connection manager 125 are software and are shown in the software (SW) domain of the USB host system 100 in FIG. 1.

In the example of FIG. 1, the USB host controller 101 is a USB3 extensible Host Controller Interface (XHCI) controller, and the USB host driver 123 is an XHCI driver. These are, of course, non-limiting examples. The USB host controller 101 and the USB host driver 123 may be any suitable USB host controller and any suitable USB host driver. The USB host controller 101 controls how the hardware of the USB host system 100 behaves, e.g., how the USB host system 100 accesses the physical channel (e.g., USB connectors 117, such as Type-C connectors) and transmits (e.g., send or receive) electrical signals over the physical channel.

The USB host driver 123 is a software program (e.g., a device driver) that drives the USB host controller 101 and provides a software interface to the hardware of the USB host system 100. The USB host driver 123 enables the operating system (OS) and other computer programs to access USB hardware functions without needing to know precise details about the hardware being used. The USB host driver 123 may run on, e.g., the processor of the computer and may be stored in, e.g., the Basic Input/Output System (BIOS) of the computer. USB host controller and USB host driver are defined in USB specifications and known in the art, and the details are not discussed here.

The connection manager 125 is a software program that functions to, among other things, establish path(s) (e.g., tunneled paths) between the USB host controller 101 and USB device controller 209 of USB device(s) connected to the USB host system 100. Other functions of the connection manager 125 include: managing the protocol adapters (e.g., 109, 111, 113, 115) of the USB host router 107, programming the protocol adapters, and bandwidth management (e.g., deciding the bandwidth (e.g., data rate) assigned for each tunneled protocol). The connection manager 125 may run on, e.g., the processor of the computer. USB connection manager is defined in USB specifications and known in the art, and the details are not discussed here.

Figure 2:
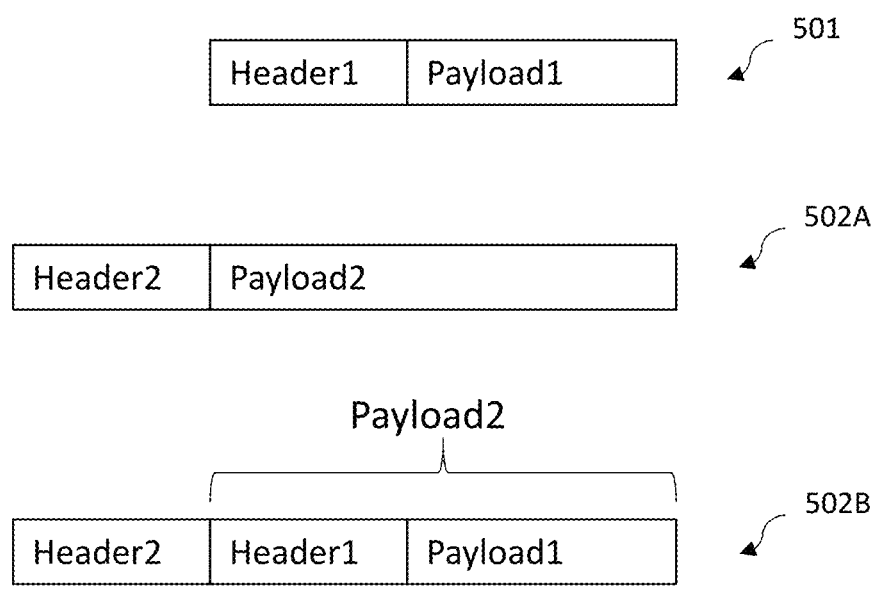
FIG. 2 illustrates data packets used in protocol tunneling in an implementation.

In the example of FIG. 1, the USB host router 107 (e.g., a USB4 host router) provides a high-speed (e.g., up to 80 Gbps) link channel (e.g., a data link layer channel) between the USB host router 107 and the USB device router 201 of the USB device 200 connected to the USB host system 100. The link channel is shared by multiple controllers (e.g., 101, 119, 121) of the USB host system 100 through protocol tunneling. The multiple controllers (e.g., 101, 119, 121) may send data packets 501 (see in FIG. 2) with different protocol formats (e.g., Gen X format, Gen T format, PCIe format, or Display Port (DP) format), and the data packets 501 with different protocol formats are encapsulated in data packets 502 (see FIG. 2) transmitted between the USB host router 107 and the USB device router 201 of the connected USB device (e.g., a USB device supporting USB4 specification). In other words, the data packets 502 (e.g., data packets having protocol format defined by USB4 specification, also referred to as USB4 data packets) carry the data packets 501 with different protocol formats in the payload regions of the data packets 502, thus allowing the data packets 501 with different protocol formats to be transmitted on the shared link channel as data packets 502. This is referred to as protocol tunneling in the USB specification. FIG. 2 illustrates protocol tunneling.

FIG. 2 illustrates a data packet 501 and a data packet 502 in an implementation. In FIG. 2, the data packet 502 is shown twice as 502A and 502B. The data packet 502A shows the data packet 502 before the data packet 501 is packed (e.g., carried) in the payload region of the data packet 502, and the data packet 502B shows the data packet 502 after the data packet 501 is packed into the payload region of the data packet 502.

In FIG. 2, the data packet 501 may be, e.g., a data packet in Gen X protocol format, Gen T protocol format, PCIe protocol format, or DP protocol format. The data packet 501 has a header (labeled as "header1") and a payload (labeled as "payload1"). Similarly, the data packet 502 has a header (labeled as "header2") and a payload (labeled as "payload2"). Through protocol tunneling, the data packet 501 is packed (e.g., carried) in the payload region of the data packet 502. The header of the data packet 502 may include bits to indicate the type (e.g., the protocol format) of the data packet 501 carried, the address (e.g., destination controller) of the carried data packet 501, and so on. Once the data packet 502 reaches the destination system (e.g., 100 or 200), the data packet 501 may be un-packed (e.g., recovered) from the payload region of the data packet 502 and sent to its intended recipient (e.g., 101, 119, or 121).

Note that although USB4 packet and USB4 host router (and USB4 device router) are used in the illustrated implementations, these are merely non-limiting examples. A skilled artisan will readily appreciate that the principle disclosed herein can be easily applied to future generations of USB systems. For example, the USB host router 107 may be a future-generation host router, and the data packet 502 transmitted by the USB host router 107 may be in any future-generation data packet format beyond the USB4 data packet. These and other variations are fully intended to be included within the scope of the present disclosure.

Referring back to FIG. 1, the USB host router 107 includes a plurality of protocol adapters, such as a Gen X adapter 109, a Gen T adapter 111, a Peripheral Component Interconnect Express (PCIe) adapter 113, and a Display Port (DP) adapter 115. The number and the type of adapters illustrated in FIG. 1 is a non-limiting example. Other numbers and other types of adapters are also possible and are fully intended to be included within the scope of the present disclosure. For example, the USB host router 107 may have one Gen X adapter 109 and multiple Gen T adapters 111.

Each of the adapters of the USB host router 107 is used to pack and up-pack (see FIG. 2) a data packet 501 of a corresponding protocol format for protocol tunneling. In other words, each adapter is used for protocol format conversion, e.g., converting between the data packet 501 and the data packet 502.

FIG. 1 also illustrates a Gen X port 103 and a Gen T port 105 of the USB host controller 101. The Gen X port 103 and the Gen T port 105 are used to transmit (e.g., send and/or receive) data packets in Gen X protocol format and Gen T protocol format, respectively. The Gen X port 103 is coupled to the Gen X adapter 109 of the USB host router 107, and the Gen T port 105 is coupled to the Gen T adapter 111 of the USB host router 107.

FIG. 1 further illustrates a PCIe controller 119 and a DP controller 121. The PCIe adapter 113 of the USB host router 107 is coupled to the PCIe controller 119. The DP adapter 115 of the USB host router 107 is coupled to the DP controller 121.

As discussed above, the various controller (e.g., 101, 119, 121) may send data packets 501 in different protocol formats. The data packets 501 are encapsulated as data packet 502 by the respective adapters (e.g., 109, 111, 113, 115) and sent through a USB connector 117 (e.g., a USB Type-C connector, also referred to as a USB Type-C port) to a connected USB device (or a USB hub).

The USB device system 200 in FIG. 1 includes a USB device controller 209 (e.g., a USB3 device controller) and a USB device router 201. The USB device controller 209 includes a Gen X port 211 and a Gen T port 213 for transmitting data packets of Gen X protocol format and Gen T format, respectively. The USB device router 201 includes a Gen X adapter 203 coupled to the Gen X port 211 and includes a Gen T adapter 205 coupled to the Gen T port 213. The functions of the Gen X adapter 203 and the Gen T adapter 205 are the same as or similar to the Gen X adapter 109 and the Gen T adapter 111, respectively, and the details are not repeated here. The USB device router 201 communicates through a USB connector 207 (e.g., a USB Type-C connector) with the USB host router 107. The USB device router 201 performs protocol tunneling for the USB device system 200, similar to the USB host router 107, and the details are not repeated here.

Figure 3:
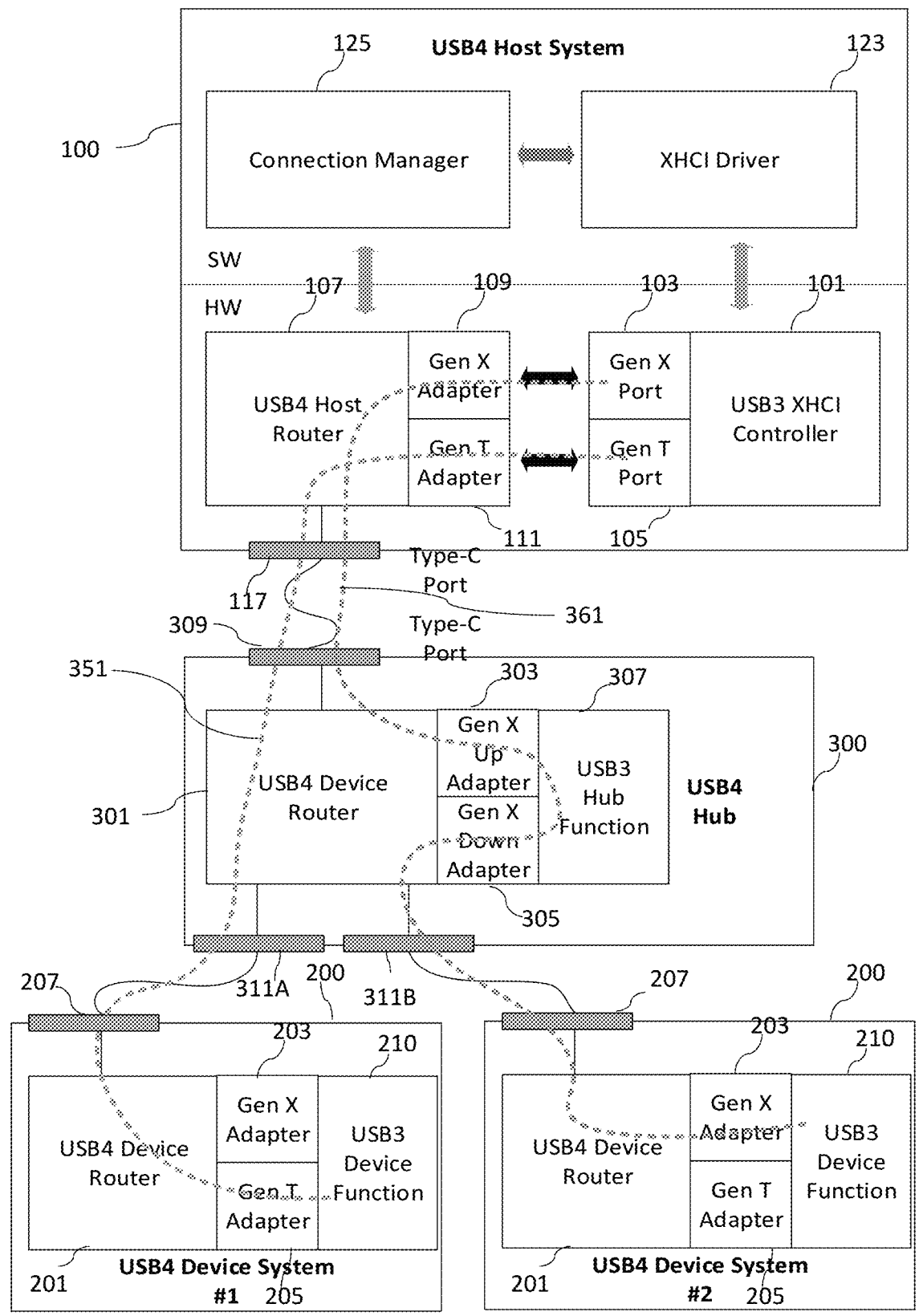
FIG. 3 illustrates connections between a USB host system and two USB device systems through a USB hub in an implementation.

FIG. 3 illustrates connections between a USB host system 100 and two USB device systems 200 through a USB hub 300 in an implementation. The USB host system 100 and the USB device systems 200 are the same as or similar to those in FIG. 1, thus details are not repeated here. Note that in FIG. 3 (and subsequent figures), for simplicity, the USB device controller 209 and the ports (e.g., Gen X port 211 and Gen T port 213) of the USB device controller 209 illustrated in FIG. 1 may be illustrated as one functional block referred to as USB device function 210.

In FIG. 3, the USB hub 300 includes a USB device router 301 (e.g., a USB4 device router), and a USB hub function 307 (e.g., USB3 hub function). The USB device router 301 includes a Gen X up adapter 303 and a Gen X down adapter 305. In an implementation, the USB hub function 307 is a USB3 hub that performs the hub function in accordance with the USB3 specification. The USB hub 300 has a USB connector 309 (e.g., USB Type-C port) connected to the USB connector 117 of the USB host system 100, and has two USB connectors 311A and 311B (e.g., USB Type-C ports) connected to the USB connectors 207 of two USB device systems 200. The number of USB connectors shown in FIG. 3 is illustrative and non-limiting, and other numbers are also possible.

In some implementations, data packet 502 carrying Gen T data packets (e.g. data packet in Gen T protocol format) simply passes through the USB device router 301 of the USB hub 300. For data packet 502 carrying Gen X data packets (e.g. data packet in Gen X protocol format), the USB device router 301 of the USB hub 300 routes the data packets 502 to the USB hub function 307. In some implementations, the USB hub function 307 performs standard USB3 hub function (e.g., multiplexing data packets from multiple, different USB device systems 200) and allows multiple USB device systems 200 with Gen X capability to communicate with one Gen X port 103 of the USB host controller 101. In other words, the USB host controller 101 is able to transmit data packets 501 of Gen X protocol format to multiple USB devices 200 using only one Gen X port 103 and one Gen X adapter 109. In contrast, the number of Gen T adapter 111 (or the number of Gen T port 105) decides (e.g., equals) the number of USB devices 200 exchanging Gen T data packets with the USB host controller 101.

In the example of FIG. 3, the USB host router 107 of the USB host system 100 has one Gen T adapter 111, and therefore, can only accommodate one USB device system 200 operating in Gen T mode (e.g., sending Gen T data packets). Both the USB device systems 200 in FIG. 3 support Gen T protocol and Gen X protocol. The first one of the USB device systems 200 is assigned a Gen T connection, and therefore, a tunneled path 351 is established between the Gen T port 105 of the USB host controller 101 and the Gen T port (not illustrated in FIG. 3) of the USB device controller in the USB device function 210. Since the USB host system 100 in the example of FIG. 3 only has one Gen T adapter 111, the second one of the USB device systems 200 is assigned a Gen X connection, and therefore, a tunneled path 361 is established between the Gen X port 103 of the USB host controller 101 and the Gen X port (not illustrated in FIG. 3) of the USB device controller in the USB device function 210.

A Gen T device (e.g., a USB device supporting Gen T tunneling protocol) is required to be backward compatible to support Gen X tunneling. After discovering the device router capabilities, the connection manager's preference is to establish a Gen T path between the USB host (e.g., a USB3 host) and the USB device (e.g., a USB3 device) through protocol tunneling. If the USB device or the USB host does not support Gen T protocol, or there is no free Gen T port available in the USB host controller, the connection manager would set up a Gen X path between the USB host and the USB device.

The current USB specification (e.g., the USB4 specification) assumes that once a Gen T path or a Gen X path is established, it will remain intact until the USB device is physically disconnected. In other words, once a USB tunneled path is established through USB4 protocol tunneling for a particular protocol (Gen X or Gen T), the USB specification does not define any method to tear down (e.g., disconnect) the tunneled path and establish a new tunneled path for an alternate protocol, while the USB device remains physically connected to the USB host. This disclosure discloses new capabilities and flow (e.g., method) to achieve soft disconnect and reconnect of tunneled paths for USB systems.

There are many reasons or scenarios where the ability to dynamically (e.g., on-the-fly, or on-demand) switch the tunneling protocol while the USB device remains physically connected to the USB host is advantageous. Consider a scenario where the USB host architecture supports partial features of the USB specification, and the USB device expects transfer modes which the USB host does not support. For example, a particular USB host implementation may not support isochronous transfer for Gen T protocol tunneling. This implementation can make the USB host controller design much simpler without sacrificing much performance because isochronous transfer is an optional feature for Gen T, and it is unlikely that a USB device vendor will implement it. In the example discussed here, the USB device does support isochronous transfer, and the USB host driver discovers that the USB device wants to communicate through isochronous transfer mode only after the USB connection is established and the USB host driver parses the USB device descriptors. With the protocol switching flow (e.g., method to switch tunneling protocol) disclosed herein in place, the USB host driver can ask the connection manager to switch from Gen T connection (e.g., a tunneled path using Gen T protocol tunneling) to Gen X connection (e.g., a tunneled path using Gen X protocol tunneling) to enable isochronous transfer. Without the protocol switching flow disclosed herein, the USB host driver may have to report that the USB device is not supported.

As another example, when a USB device (e.g., a USB4 device that supports both Gen X and Gen T protocols) is plugged in, there may not be a Gen T downstream port available in the USB host controller. Therefore, the connection manager enables the USB device and establishes a Gen X connection. Later, some other Gen T device is disconnected from the USB host, freeing up a Gen T downstream port in the USB host controller. Noticing the available downstream Gen T port, the connection manager can initiate a Gen X soft disconnect (to disconnect the Gen X tunneled path) and reestablish a Gen T connection for the USB device. This allows the USB device to achieve higher throughput opportunistically (e.g., whenever possible).

As yet another example, there might be compatibility issues with certain USB devices operating in Gen T mode. With the protocol switching flow in place, the USB host driver can, after discovering an incompatibility issue of a connected USB device, request the connection manager to soft disconnect the Gen T path for the USB device and reestablish connection through a Gen X path. By downgrading the connection of the USB device to a legacy mode (e.g., Gen X mode), better compatibility is achieved when needed. An example of protocol switching flow is illustrated below with reference to FIGS. 4-6.

Figure 4:
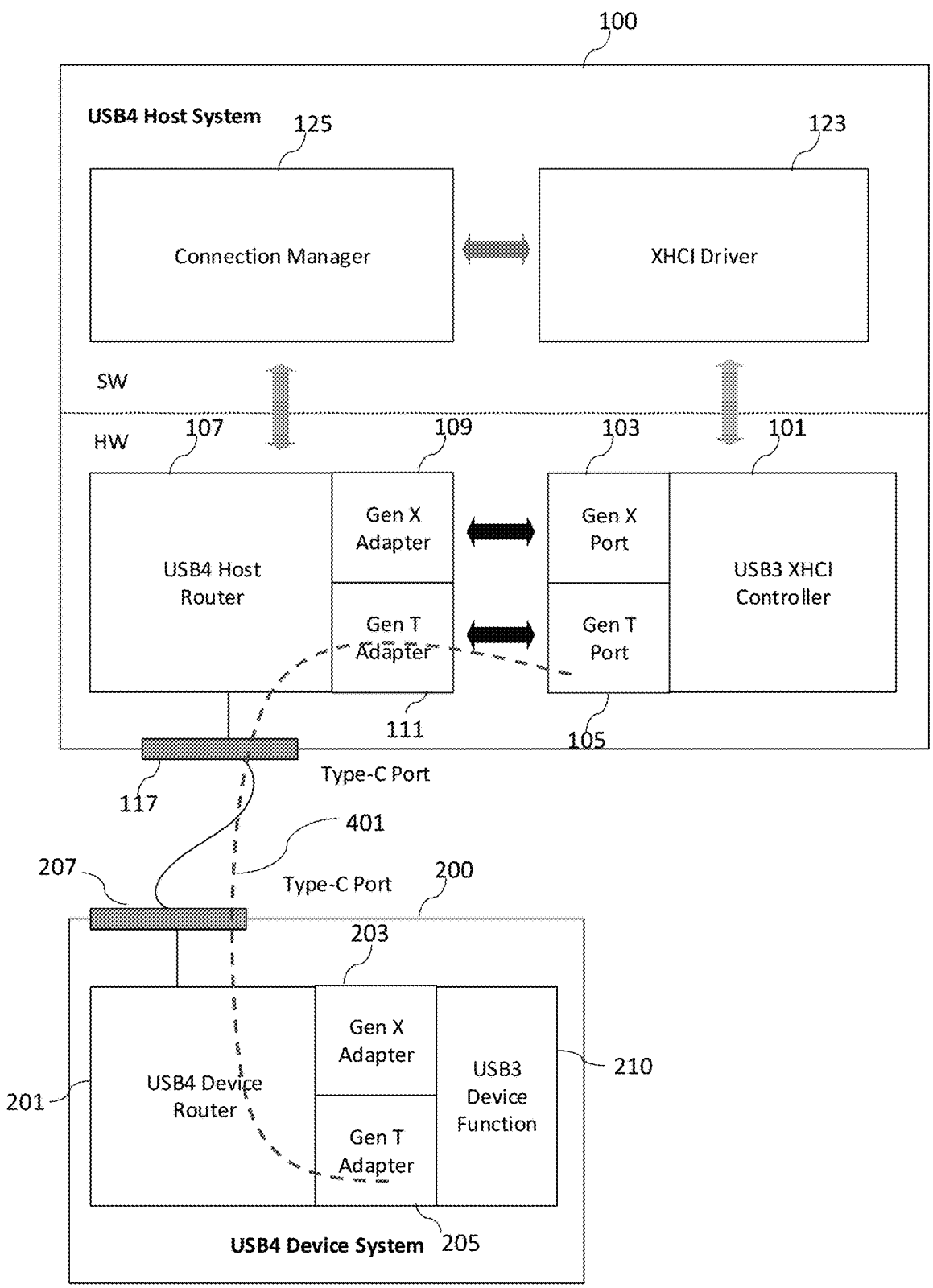
FIGS. 4-6 illustrate a protocol switching flow for tunneled paths between a USB host system and a USB device system in an implementation.

In FIG. 4, after the USB device 200 (e.g., a USB device that supports Gen X and Gen T mode) is plugged into the USB connector 117 of the USB host system 100, a tunneled path 401 of Gen T type (e.g., using Gen T protocol tunneling) is initially established between the Gen T port 105 of the USB host controller 101 of the USB host system 100 and the Gen T port 213 (not illustrated in FIG. 4 but illustrated in FIG. 1) of the USB device controller 209 of the USB device 200. The process of detecting a newly plugged-in USB device and assigning a connection type (e.g., Gen T or Gen X) for the USB device is described in USB specifications and known in the art, and the details are not discussed here.

Next, the USB host driver 123 receives descriptors of the USB device 200. The descriptors may contain information such as the operation modes and/or data rates supported by the USB device 200. The descriptors may be sent from the USB device 200 to the USB host 100 through a regular data channel between the USB device 200 and the USB host 100, where the regular data channel is different from the tunneled path 401. After parsing the descriptors, the USB host driver 123 finds out that the Gen T mode of the USB device 200 is not compatible with that of the USB host 100, and therefore, the USB host driver 123 triggers a protocol switching flow in order to soft disconnect the Gen T path (e.g., 401) and establish a Gen X path. Details are discussed below.

In some implementations, in a first step of the protocol switching flow, the USB host driver 123 disables the downstream port of the initial tunneled path 401. In the illustrated example of FIG. 4, the downstream port is the Gen T port 105. The USB host driver 123 may disable the downstream port (e.g., 105) by programming a control bit (e.g., writing a value of 0 for the control bit) for the downstream port in a control register of the USB host controller 101. Disabling the downstream port breaks down (e.g., prohibits or stops) data transmission on the tunneled path 401. Therefore, disabling the downstream port (e.g., 105) may also be referred to as disabling the corresponding tunneled path (e.g., 401).

Next, in a second step of the protocol switching flow, the USB host driver 123 send a protocol switching request to the connection manager 125. For example, the USB host driver 123 may request to switch from the Gen T type connection to a Gen X type connection for the USB device 200.

Figure 5:
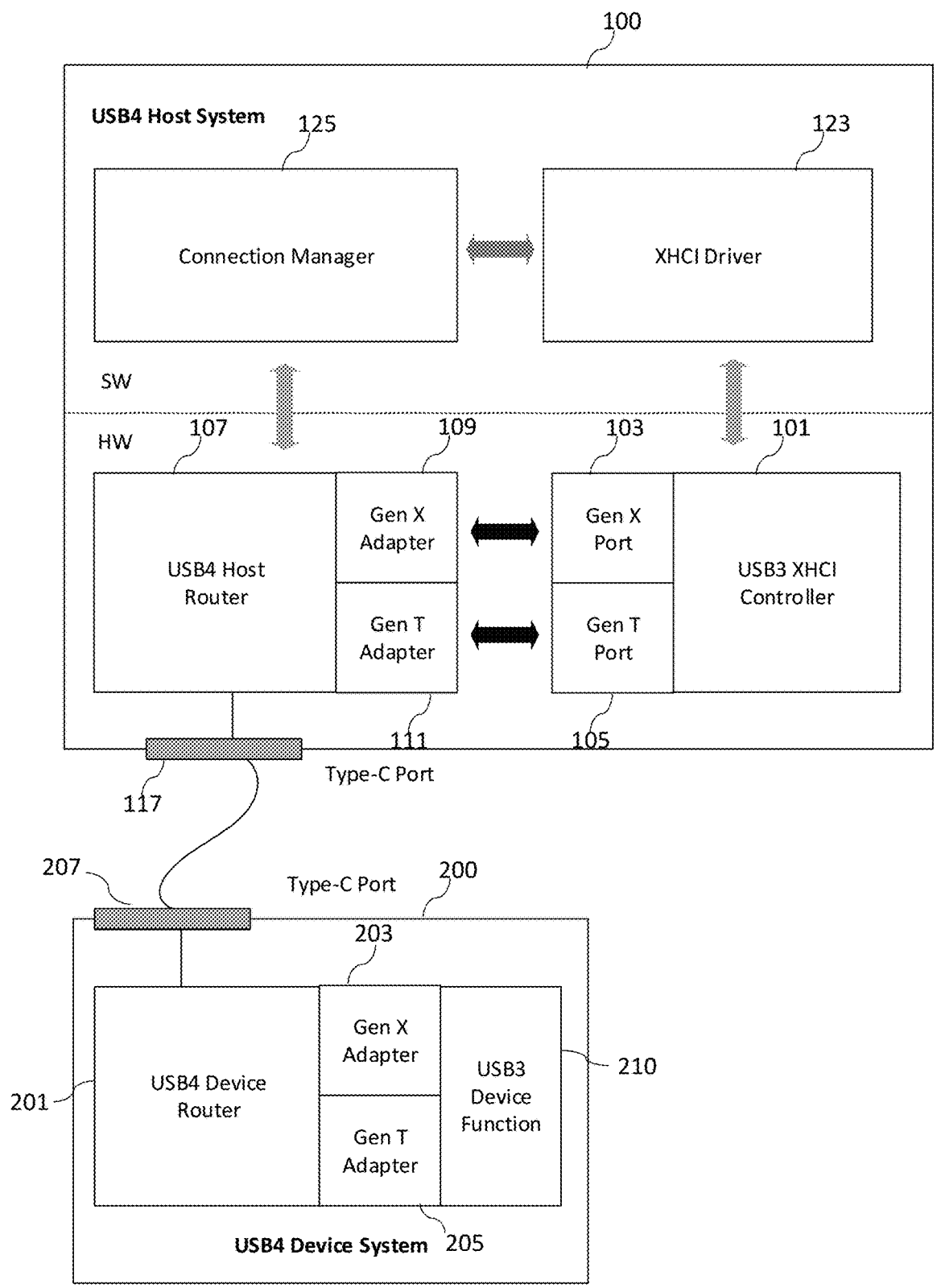

Referring next to FIG. 5, in a third step of the protocol switching flow, the connection manager 125 tears down (e.g., disconnect) the tunneled path 401, e.g., by disabling the Gen T adapter 111 of the USB host router 107 and the Gen T adapter 205 of the USB device router 201. Since the tunneled path 401 is disconnected in the processing step of FIG. 5, the tunneled path 401 shown in FIG. 4 is no longer shown in FIG. 5. The connection manager 125 may disable the Gen T adapters 111 and 205 by programming the Path Enable (PE) control bit (e.g., writing a value of 0 for the control bit) for the Gen T adapter 111 in a control register of the USB host router 107, and by programming the Path Enable (PE) control bit (e.g., writing a value of 0 for the control bit) for the Gen T adapter 205 in a control register of the USB device router 201. Disabling the Gen T adapters 111 and 205 disconnects (e.g., clears, removes) the tunneled path 401, and results in a disconnect event in the USB host driver software stack. This achieves the soft disconnect of the tunneled path 401. After the tunneled path 401 is disconnected, the connection manager 125 informs the USB host driver 123 of the disconnection of the tunneled path 401.

Figure 6:
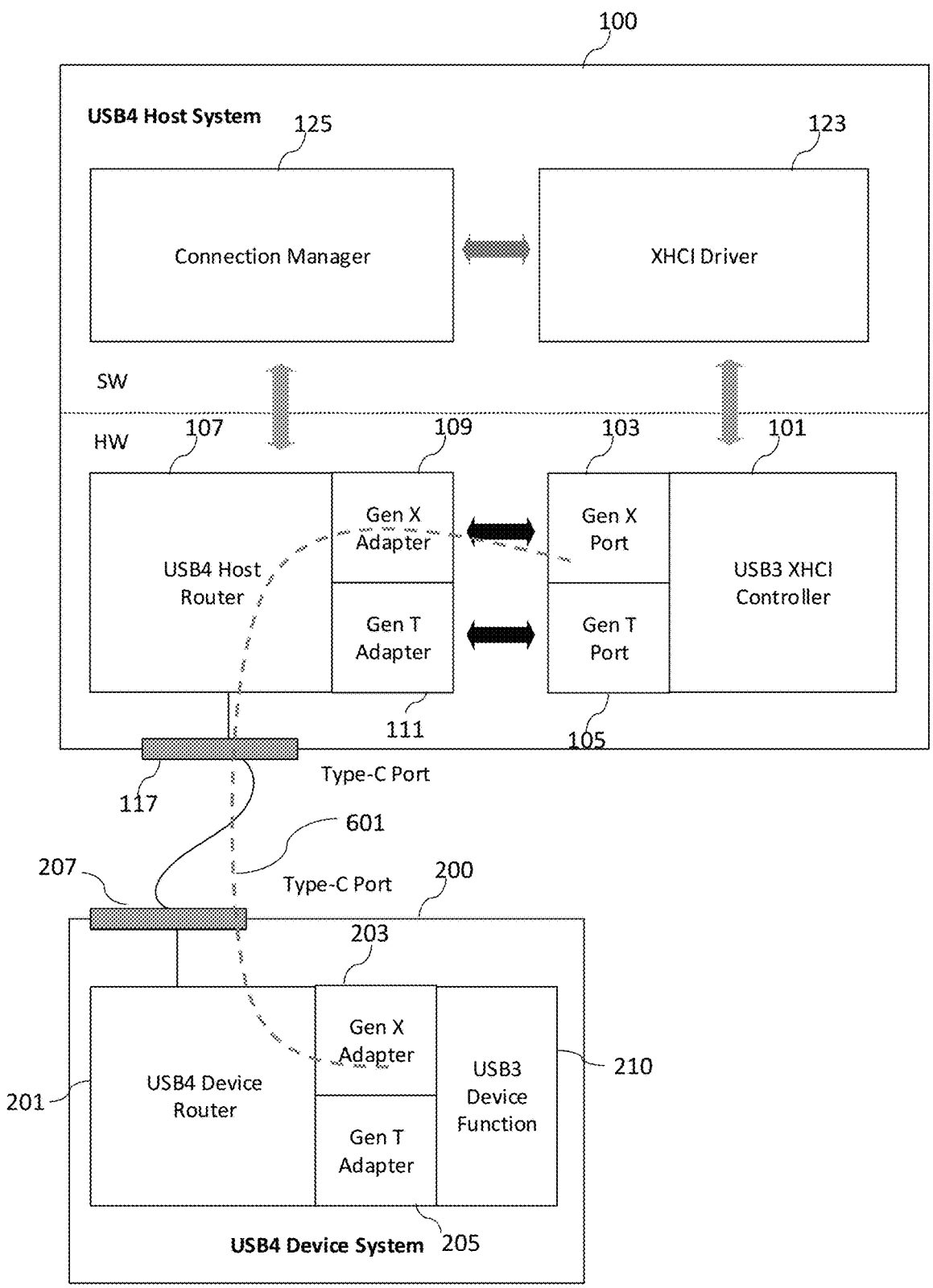

Referring next to FIG. 6, in a third step of the protocol switching flow, the connection manager 125 establishes the tunneled path 601 of Gen X type between the Gen X port 103 of the USB host controller 101 and the Gen X port 211 (not illustrated in FIG. 4 but illustrated in FIG. 1) of the USB device controller 209. The connection manager 125 establishes the tunneled path 601 by enabling the Gen X adapter 109 of the USB host router 107 and the Gen X adapter 203 of the USB device router 201. The connection manager 125 may enable the Gen X adapters 109 and 203 by programming the Path Enable (PE) control bit (e.g., writing a value of 1 for the control bit) for the Gen X adapter 109 in the control register of the USB host router 107, and by programming the Path Enable (PE) control bit (e.g., writing a value of 1 for the control bit) for the Gen X adapter 203 in the control register of the USB device router 201. The programming of the PE control bit of the Gen X adapter 203 may be done through a sideband channel. After the tunneled path 601 is established, the connection manager 125 informs the USB host driver 123 of the establishment of the tunneled path 601.

Once the tunneled path 601 is established, data packets of Gen X protocol format may be transmitted on the tunneled path 601. In some implementations, the disconnect of the tunneled path 401 and the establishment of the tunneled path 601 happens in the background without user (e.g., human user) notifications. For example, the operation system (OS) driver may suppress user notifications regarding the disconnect of the tunneled path 401 and the establishment of the tunneled path 601.

FIGS. 4-6 show a protocol switch flow to replace a Gen T tunneled path with a Gen X tunneled path. Upon reading the discussion herein, a skilled artisan will readily be able to apply the principle disclosed herein for a protocol switch flow to replace a Gen X tunneled path with a Gen T tunneled path. In addition, the protocol switch flow can be used not only for a newly connected USB device but also for a USB device already transmitting data packets using a first type (e.g., Gen X type) of tunneled path. As discussed above, if a Gen T capable USB device is initially assigned a Gen X connection (e.g., due to lack of downstream Gen T port initially), and later if a downstream Gen T port becomes available, the principle of the protocol switching flow discussed above can be applied to upgrade the connection from Gen X connection to Gen T connection. Furthermore, if a USB hub 300 is connected between the USB device 200 and the USB host 100, the protocol switch flow still applies and may be modified accordingly to achieve protocol switching for such a configuration. These and other variations are fully intended to be included within the scope of the present disclosure.

FIG. 7 illustrates a flow chart of a method 700 of operating a USB host system in some implementations. It should be understood that the example method shown in FIG. 7 is merely an example of many possible example methods. A skilled artisan would recognize many variations, alternatives, and modifications. For example, various steps as illustrated in FIG. 7 may be added, removed, replaced, rearranged, or repeated.

Referring to FIG. 7, at block 710, a first tunneled path between a first port of a USB host controller of the USB host system and a first port of a USB device controller of a USB device is disabled by a USB host driver of the USB host system, wherein the USB device is connected to the USB host system, wherein the first port of the USB host controller is coupled to a first protocol adapter of a USB host router of the USB host system, wherein the first port of the USB device controller is coupled to a first protocol adapter of a USB device router of the USB device, wherein the first tunneled path is configured to, through protocol tunneling, transmit first data packets of a first protocol format. At block 720, a request for protocol switching is sent to a connection manager of the USB host system by the USB host driver. At block 730, the first tunneled path is disconnected by the connection manager by disabling the first protocol adapter of the USB host router and disabling the first protocol adapter of the USB device router. At block 740, a second tunneled path between a second port of the USB host controller and a second port of the USB device controller is established by the connection manager, wherein establishing the second tunneled path comprises enabling a second protocol adapter of the USB host router coupled to the second port of the USB host controller, and enabling a second protocol adapter of the USB device router coupled to the second port of the USB device controller.

Implementations may achieve advantages as described below. For example, the disclosed protocol switching flow may be used to disconnect a first type of tunneled path and establish a second type of tunneled path between a USB host and a USB device, while the USB device remains physically connected to the USB host. The ability to switch between different types (e.g., Gen T type or Gen X type) of tunneled paths dynamically avoids or overcomes certain incompatibility issues, and allows the USB device to achieve higher throughput when opportunity occurs. The disclosed protocol switching flow can be implemented using hardware modules (e.g., 101, 107) and software modules (e.g., 123, 125) already defined in the USB specification, and therefore, can be implemented to enhance the performance of USB systems without the need for hardware change or software change.

Examples of the present invention are summarized here. Other examples can also be understood from the entirety of the specification and the claims filed herein.

Example 1. A method of operating a Universal Serial Bus (USB) host system includes: disabling, by a USB host driver of the USB host system, a first tunneled path between a first port of a USB host controller of the USB host system and a first port of a USB device controller of a USB device, wherein the first tunneled path is configured to, through protocol tunneling, transmit first data packets of a first protocol format; sending, by the USB host driver, a request for protocol switching to a connection manager of the USB host system; disconnecting, by the connection manager, the first tunneled path; and establishing, by the connection manager, a second tunneled path between a second port of the USB host controller and a second port of the USB device controller.

Example 2. The method of Example 1, wherein the first port of the USB host controller is coupled to a first protocol adapter of a USB host router of the USB host system, wherein the first port of the USB device controller is coupled to a first protocol adapter of a USB device router of the USB device.

Example 3. The method of Example 2, further comprising, after establishing the second tunneled path, transmitting, through protocol tunneling, second data packets of a second protocol format on the second tunneled path, wherein the second protocol format is different from the first protocol format.

Example 4. The method of Example 3, wherein third data packets are configured to carry the first data packets and the second data packets in payload regions of the third data packets, wherein the third data packets are transmitted between the USB host router and the USB device router.

Example 5. The method of Example 3, further comprising: notifying, by the connection manager, the USB host driver that the first tunneled path is disconnected after disconnecting the first tunneled path and before establishing the second tunneled path; and notifying, by the connection manager, the USB host driver that the second tunneled path is established after establishing the second tunneled path and before transmitting the second data packets.

Example 6. The method of Example 3, wherein disconnecting the first tunneled path comprises: disabling the first port of the USB host controller; disabling the first protocol adapter of the USB host router; and disabling the first protocol adapter of the USB device router.

Example 7. The method of Example 6, wherein establishing the second tunneled path comprises: enabling a second protocol adapter of the USB host router coupled to the second port of the USB host controller; and enabling a second protocol adapter of the USB device router coupled to the second port of the USB device controller.

Example 8. The method of Example 7, wherein the first protocol format and the second protocol format are USB4 Gen X format and USB4 Gen T format, respectively.

Example 9. The method of Example 8, wherein the first protocol adapter of the USB host router and the first protocol adapter of the USB device router are USB4 Gen X protocol adapters, wherein the second protocol adapter of the USB host router and the second protocol adapter of the USB device router are USB4 Gen T protocol adapters.

Example 10. The method of Example 7, wherein the first protocol format and the second protocol format are USB4 Gen T format and USB4 Gen X format, respectively.

Example 11. The method of Example 10, wherein the first protocol adapter of the USB host router and the first protocol adapter of the USB device router are USB4 Gen T protocol adapters, wherein the second protocol adapter of the USB host router and the second protocol adapter of the USB device router are USB4 Gen X protocol adapters.

Example 12. A method of operating a Universal Serial Bus (USB) host system includes: transmitting first data packets of a first protocol format through a first tunneled path between a first port of a USB host controller of the USB host system and a first port of a USB device controller of a USB device, wherein the USB device is connected to the USB host system; stopping, by a USB host driver of the USB host system, transmission of the first data packets by disabling the first port of the USB host controller; sending, by the USB host driver, a request for protocol switching to a connection manager of the USB host system; tearing down, by the connection manager, the first tunneled path; establishing, by the connection manager, a second tunneled path between a second port of the USB host controller and a second port of the USB device controller; and transmitting second data packets of a second protocol format through the second tunneled path, wherein the second protocol format is different from the first protocol format.

Example 13. The method of Example 12, wherein stopping transmission of the first data packets comprises: programming, by the USB host driver, a control bit in a control register of the USB host controller to disable the first port of the USB host controller.

Example 14. The method of Example 12, wherein tearing down the first tunneled path comprises: disabling, by the connection manager, a first protocol adapter of a USB host router of the USB host system connected to the first port of the USB host controller; and disabling, by the connection manager, a first protocol adapter of a USB device router of the USB device connected to the first port of the USB device controller.

Example 15. The method of Example 14, wherein establishing the second tunneled path comprises: enabling, by the connection manager, a second protocol adapter of the USB host router connected to the second port of the USB host controller; and enabling, by the connection manager, a second protocol adapter of the USB device router connected to the second port of the USB device controller.

Example 16. In an implementation, a Universal Serial Bus (USB) host system includes: a USB host controller having a first port and a second port, wherein the first port and the second port of the USB host controller are configured to transmit data packets in a first protocol format and a second protocol format, respectively; a USB host driver that drives the USB host controller; a USB connector for connection with a USB device; a USB host router having a first protocol adapter and a second protocol adapter, wherein the USB host router is configured to transmit data packets in a third protocol format via the USB connector, wherein the first protocol adapter and the second protocol adapter of the USB host router are coupled to the first port and the second port of the USB host controller, respectively; and a connection manager coupled to the USB host driver and the USB host router, wherein the USB host system is configured to: disable, by the USB host driver, a first tunneled path between the first port of the USB host controller and a first port of a USB device controller of the USB device; send, by the USB host driver, a request for protocol switching to the connection manager; tear down, by the connection manager, the first tunneled path; and establish, by the connection manager, a second tunneled path between the second port of the USB host controller and a second port of the USB device controller.

Example 17. The USB host system of Example 16, wherein the USB host controller and the USB host router belong to a hardware domain of the USB host system, and wherein the USB driver and the connection manager belong to a software domain of the USB host system.

Example 18. The USB host system of Example 16, wherein the USB host system is configured to disable the first tunneled path by disabling the first port of the USB host controller.

Example 19. The USB host system of Example 18, wherein the first port of the USB device controller is coupled to a first protocol adapter of a USB device router of the USB device, wherein the USB host system is configured to tear down the first tunneled path by disabling the first protocol adapter of the USB host router and by disabling the first protocol adapter of the USB device router, wherein the USB host system is configured to establish the second tunneled path by enabling the second protocol adapter of the USB host router and by enabling a second protocol adapter of the USB device router coupled to the second port of the USB device controller.

Example 20. The USB host system of Example 16, wherein the USB host system is further configured to: after establishing the second tunneled path, transmit data packets between the USB host controller and the USB device controller via the second tunneled path.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A method of operating a Universal Serial Bus (USB) host system, the method comprising:
    disabling, by a USB host driver of the USB host system, a first tunneled path between a first port of a USB host controller of the USB host system and a first port of a USB device controller of a USB device, wherein the first tunneled path is configured to, through protocol tunneling, transmit first data packets of a first protocol format;
    sending, by the USB host driver, a request for protocol switching to a connection manager of the USB host system;
    disconnecting, by the connection manager, the first tunneled path; and
    establishing, by the connection manager, a second tunneled path between a second port of the USB host controller and a second port of the USB device controller.

2. The method of claim 1, wherein the first port of the USB host controller is coupled to a first protocol adapter of a USB host router of the USB host system, wherein the first port of the USB device controller is coupled to a first protocol adapter of a USB device router of the USB device.

3. The method of claim 2, further comprising, after establishing the second tunneled path, transmitting, through protocol tunneling, second data packets of a second protocol format on the second tunneled path, wherein the second protocol format is different from the first protocol format.

4. The method of claim 3, wherein third data packets are configured to carry the first data packets and the second data packets in payload regions of the third data packets, wherein the third data packets are transmitted between the USB host router and the USB device router.

5. The method of claim 3, further comprising:
    notifying, by the connection manager, the USB host driver that the first tunneled path is disconnected after disconnecting the first tunneled path and before establishing the second tunneled path; and
    notifying, by the connection manager, the USB host driver that the second tunneled path is established after establishing the second tunneled path and before transmitting the second data packets.

6. The method of claim 3, wherein disconnecting the first tunneled path comprises:
    disabling the first port of the USB host controller;
    disabling the first protocol adapter of the USB host router; and
    disabling the first protocol adapter of the USB device router.

7. The method of claim 6, wherein establishing the second tunneled path comprises:
    enabling a second protocol adapter of the USB host router coupled to the second port of the USB host controller; and
    enabling a second protocol adapter of the USB device router coupled to the second port of the USB device controller.

8. The method of claim 7, wherein the first protocol format and the second protocol format are USB4 Gen X format and USB4 Gen T format, respectively.

9. The method of claim 8, wherein the first protocol adapter of the USB host router and the first protocol adapter of the USB device router are USB4 Gen X protocol adapters, wherein the second protocol adapter of the USB host router and the second protocol adapter of the USB device router are USB4 Gen T protocol adapters.

10. The method of claim 7, wherein the first protocol format and the second protocol format are USB4 Gen T format and USB4 Gen X format, respectively.

11. The method of claim 10, wherein the first protocol adapter of the USB host router and the first protocol adapter of the USB device router are USB4 Gen T protocol adapters, wherein the second protocol adapter of the USB host router and the second protocol adapter of the USB device router are USB4 Gen X protocol adapters.

12. A method of operating a Universal Serial Bus (USB) host system, the method comprising:
- transmitting first data packets of a first protocol format through a first tunneled path between a first port of a USB host controller of the USB host system and a first port of a USB device controller of a USB device, wherein the USB device is connected to the USB host system;
- stopping, by a USB host driver of the USB host system, transmission of the first data packets by disabling the first port of the USB host controller;
- sending, by the USB host driver, a request for protocol switching to a connection manager of the USB host system;
- tearing down, by the connection manager, the first tunneled path;
- establishing, by the connection manager, a second tunneled path between a second port of the USB host controller and a second port of the USB device controller; and
- transmitting second data packets of a second protocol format through the second tunneled path, wherein the second protocol format is different from the first protocol format.

13. The method of claim 12, wherein stopping transmission of the first data packets comprises:
- programming, by the USB host driver, a control bit in a control register of the USB host controller to disable the first port of the USB host controller.

14. The method of claim 12, wherein tearing down the first tunneled path comprises:
- disabling, by the connection manager, a first protocol adapter of a USB host router of the USB host system connected to the first port of the USB host controller; and
- disabling, by the connection manager, a first protocol adapter of a USB device router of the USB device connected to the first port of the USB device controller.

15. The method of claim 14, wherein establishing the second tunneled path comprises:
- enabling, by the connection manager, a second protocol adapter of the USB host router connected to the second port of the USB host controller; and
- enabling, by the connection manager, a second protocol adapter of the USB device router connected to the second port of the USB device controller.

16. A Universal Serial Bus (USB) host system comprising:
- a USB host controller having a first port and a second port, wherein the first port and the second port of the USB host controller are configured to transmit data packets in a first protocol format and a second protocol format, respectively;
- a USB host driver that drives the USB host controller;
- a USB connector for connection with a USB device;
- a USB host router having a first protocol adapter and a second protocol adapter, wherein the USB host router is configured to transmit data packets in a third protocol format via the USB connector, wherein the first protocol adapter and the second protocol adapter of the USB host router are coupled to the first port and the second port of the USB host controller, respectively; and
- a connection manager coupled to the USB host driver and the USB host router, wherein the USB host system is configured to:
- disable, by the USB host driver, a first tunneled path between the first port of the USB host controller and a first port of a USB device controller of the USB device;
- send, by the USB host driver, a request for protocol switching to the connection manager;
- tear down, by the connection manager, the first tunneled path; and
- establish, by the connection manager, a second tunneled path between the second port of the USB host controller and a second port of the USB device controller.

17. The USB host system of claim 16, wherein the USB host controller and the USB host router belong to a hardware domain of the USB host system, and wherein the USB driver and the connection manager belong to a software domain of the USB host system.

18. The USB host system of claim 16, wherein the USB host system is configured to disable the first tunneled path by disabling the first port of the USB host controller.

19. The USB host system of claim 18, wherein the first port of the USB device controller is coupled to a first protocol adapter of a USB device router of the USB device, wherein the USB host system is configured to tear down the first tunneled path by disabling the first protocol adapter of the USB host router and by disabling the first protocol adapter of the USB device router, wherein the USB host system is configured to establish the second tunneled path by enabling the second protocol adapter of the USB host router and by enabling a second protocol adapter of the USB device router coupled to the second port of the USB device controller.

20. The USB host system of claim 16, wherein the USB host system is further configured to:
- after establishing the second tunneled path, transmit data packets between the USB host controller and the USB device controller via the second tunneled path.

* * * * *